United States Patent [19]

Pollard

[11] 4,273,057
[45] Jun. 16, 1981

[54] PLANTING APPARATUS FOR A GRAIN DRILL

[75] Inventor: Lorne R. Pollard, St. Ann's, Canada

[73] Assignee: International Harvester Company, Chicago, Ill.

[21] Appl. No.: 42,752

[22] Filed: May 29, 1979

[51] Int. Cl.³ .............................................. A01C 5/06
[52] U.S. Cl. ........................................ 111/85; 111/88
[58] Field of Search .................. 111/1, 52, 73, 81, 84, 111/85, 86, 87, 63, 36, 77, 78, 75, 80, 88; 280/43, 43.11, 43.12, 43.17, 43.20; 172/425, 538

[56] References Cited

U.S. PATENT DOCUMENTS

| 345,403 | 7/1886 | Arnett | 111/85 |
|---|---|---|---|
| 1,636,620 | 7/1927 | Berry | 280/43.20 X |
| 1,879,787 | 9/1932 | Bohmker | 111/52 |
| 1,902,924 | 3/1933 | Wamhoff et al. | 111/63 |
| 2,554,061 | 5/1951 | Sandberg | 111/85 |
| 2,611,331 | 9/1952 | O'Neil | 111/73 |
| 3,060,873 | 10/1962 | Powers | 111/80 X |
| 3,220,368 | 11/1965 | Gandrup | 111/73 X |
| 3,626,877 | 12/1971 | Hansen et al. | 111/85 |
| 3,732,975 | 1/1956 | Balzer | 111/85 X |
| 4,116,140 | 9/1978 | Anderson et al. | 111/52 |

FOREIGN PATENT DOCUMENTS 1820 of 1872 United Kingdom ..................... 172/425

Primary Examiner—James R. Feyrer
Attorney, Agent, or Firm—James J. Getchius; Neal C. Johnson; F. David AuBuchon

[57] ABSTRACT

An apparatus that includes a drawbar, a pair of furrow forming disks rotatably mounted on the drawbar, a seed tube located between the disks for depositing seed in the furrow, a press gauge wheel assembly mounted on the drawbar rearward of the disks for closing the furrow and compacting the soil on both sides of the seed, and also including adjustment structure for varying the height of the press wheel relative to the drawbar for controlling furrow depth in response to pressure exerted on the apparatus.

8 Claims, 6 Drawing Figures

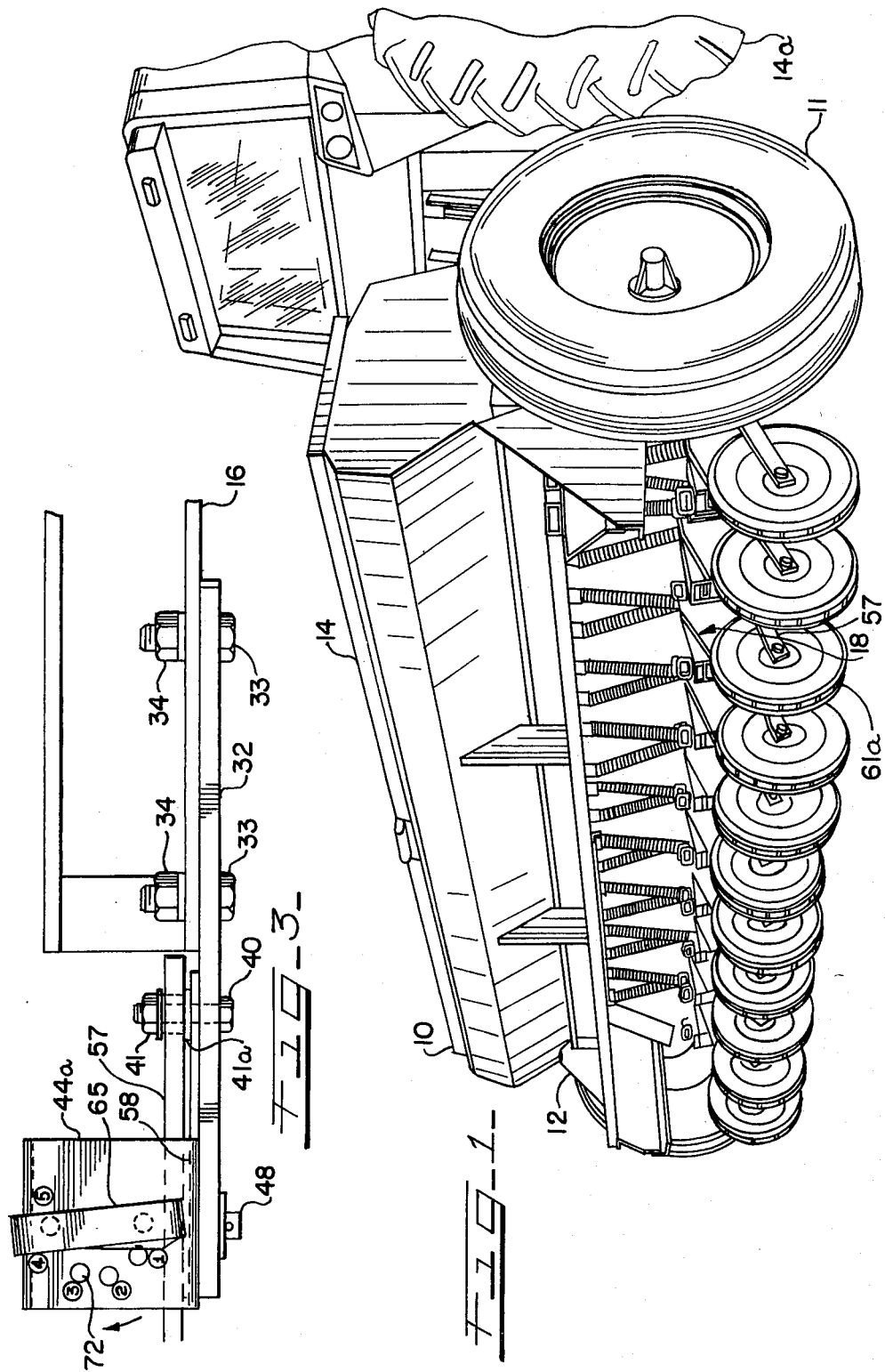

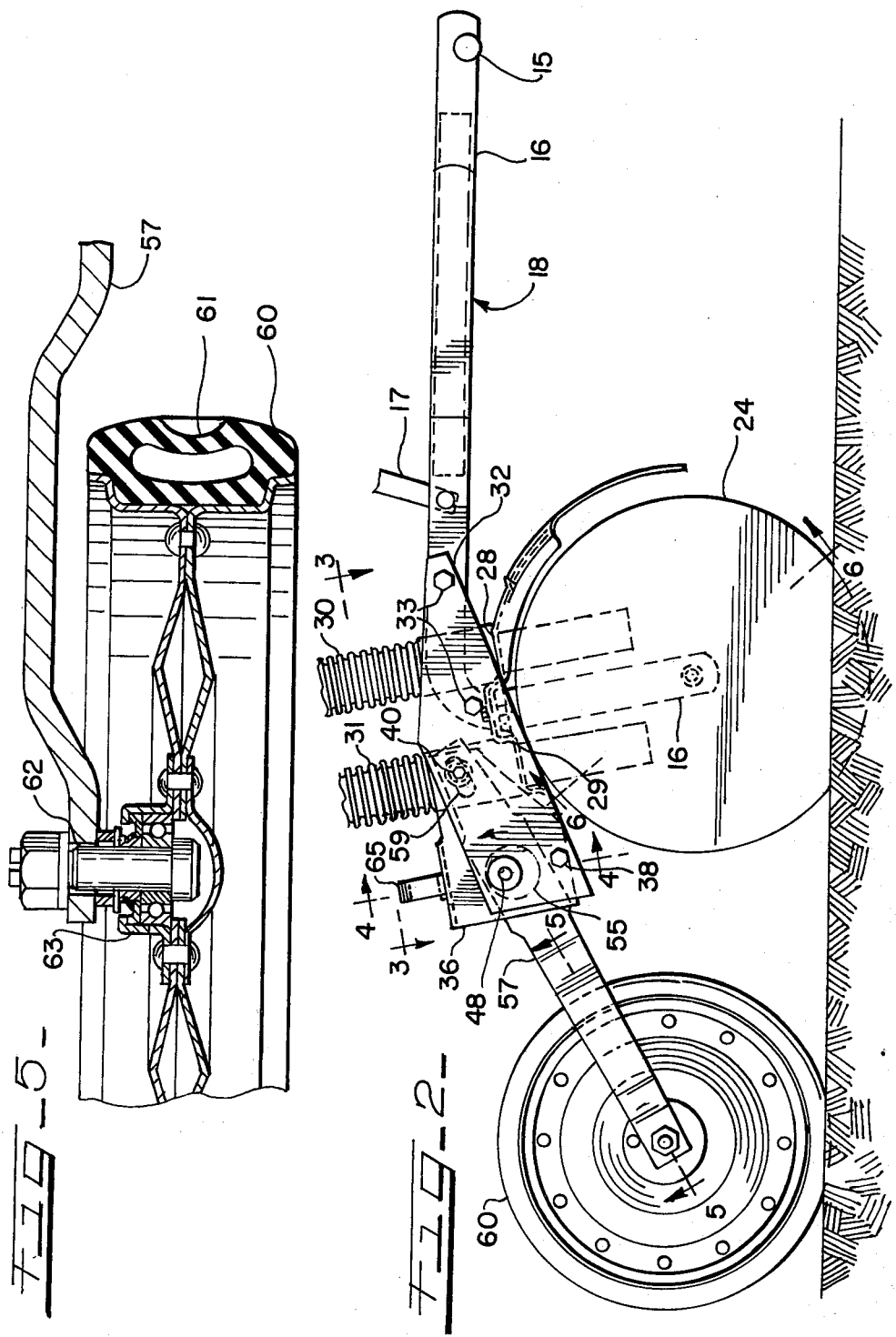

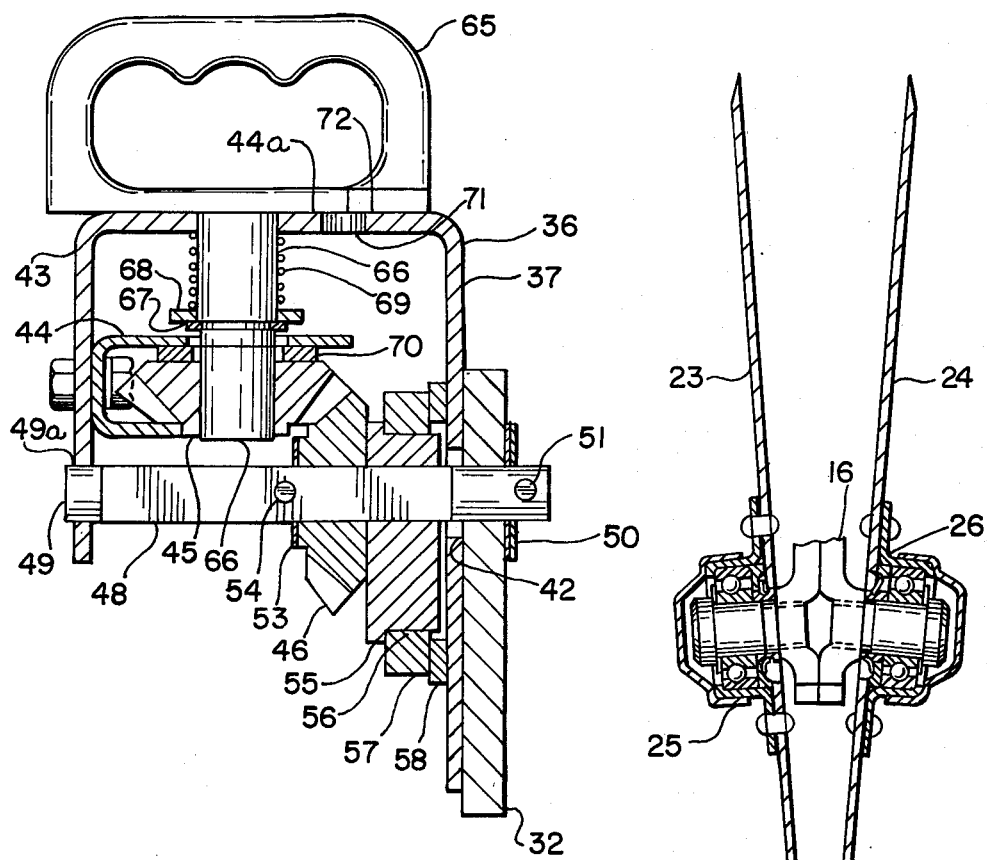

PLANTING APPARATUS FOR A GRAIN DRILL

BACKGROUND OF THE INVENTION

1. Field of the Invention

This invention pertains generally to grain drills.

2. Description of the Prior Art

Unlike row type planters, such as used for corn that may require transverse furrow spacings of 10 inches, grain drills are designed to plant at furrow spacings of 10, 8, 7, and even 6 inches or less. Therefore, the relatively movable, individual grain drill planting apparatuses are located on the drill transverse to the direction of travel frequently at the noted smaller intervals. Further, they are often staggered longitudinally along the grain drill also in the noted 6 inches or less interval. Inasmuch as the seed for all of the apparatuses, and fertilizer where desired unlike other planters, are stored in a transversely extending hopper forward of the apparatuses with seed tubes, and sometimes fertilizer tubes, extending from the hopper to the disk openers for depositing into the furrow created, each apparatus may also have a further reduced transverse width. A part of the apparatus is the press wheel which is located in line and behind the disks to close the furrow, compact the soil, and gauge or control the depth of the disk furrow openers for desired seed depth placement.

Although individual depth control is desired for seeding in varying soil and moisture conditions, the convenient provision of this adjustment in the reduced spacings between furrows and the narrow size apparatuses creates a problem. Further, the adjustment should be accessible from the rear of the drill and rearward of the press wheels. Preferably, it should be able to be accomplished by one hand and provide predetermined positive increments over a considerable range and have indicia indicating each position so that all apparatuses can be set to this position if desired. Also once set, the adjustment should be maintained against the spring load exerted by the pressure rod on the structure supporting the disk openers which forces same into the soil against the restraint offered by the press wheel in this gauging function. To date, Applicant is unaware of a planting apparatus that achieves these objectives and that does so in a convenient and practical manner.

SUMMARY OF THE INVENTION

Applicant, as a consequence, designed the planting apparatus for a grain drill of this application to meet the presently unavailable structure noted above.

Generally, Applicant desired to use the conventional double disk openers with their drawbar supporting structure to additionally support the press wheel and its adjustment. Also, to achieve the rearward positioning of the adjustment behind the double disk openers but before the press wheel and with the manual adjusting element facing rearwardly and the entire adjustment not interfering with adjacent apparatuses, it required the changing of the preferably rotatable force supplied to the element to vertical, upwardly or downwardly applied forces to the trailing type arm mounting for the press wheel to vary its height relative to the drawbar. Preferably, by use of a bevel gear rotatable in a generally horizontal plane to drive another bevel gear rotatable in a vertical plane and thus a similarly mounted cam, the wheel support arm can be raised and lowered. To prevent rotation of the wheel arm about the preferable internal cam, the wheel arm is attached to the drawbar by a slotted hole which also accommodates the additional forward and rearward movement of the rotating cam while allowing the vertical movement. Yet, when the wheel arm is set, the cam and the slot connection hold the arm firm to the drawbar against the pressure rod, and also the adjusting element is held in a detent by a spring. Some five positions of the element are provided with ⅜ inch intervals. Although the adjustment could be made on the "fly", generally removing some load on the disks by lifting the spring loaded pressure rod slightly, makes the adjustment easier. When the apparatuses are lifted from the ground for transport, the apparatuses and specifically the press wheels, are maintained in a rigid set position rather than flopping about without control.

Another feature of the apparatus is the use of a particular single press wheel having a semi-pneumatic tire that is concavely grooved about its periphery and has spaced cross ribs spanning the concavity. These features in combination, apparently prevent or at least reduce lengthy soil crusting directly above the seed for early plant emergence and reduced seedling damage.

It is, therefore, an object of this invention to provide a new and improved planting apparatus for a grain drill.

Another object of this invention is to provide an apparatus that has an adjustment for controlling furrow depth by an adjustment that essentially only spans each apparatus to avoid interference with adjacent apparatuses.

Another object of this invention is to provide an apparatus that has an adjustment to transform generally horizontal rotary movement to vertical rotary movement to the press wheel arm.

BRIEF DESCRIPTION OF THE DRAWINGS

FIG. 1 is a partial, perspective rear view of a grain drill incorporating the planting apparatuses of this invention;

FIG. 2 is a side view (similar to FIG. 1) of the apparatus of this invention;

FIG. 3 is a partial plan view of the apparatus shown in FIG. 2 taken along line 3—3 but with the press wheel not shown;

FIG. 4 is a sectional view taken along line 4—4 of FIG. 2;

FIG. 5 is a sectional view taken along lines 5—5 of FIG. 2; and

FIG. 6 is a view taken on line 6—6 of FIG. 2.

DESCRIPTION OF THE PREFERRED EMBODIMENT

Referring to FIG. 1, 10 indicates a typical grain drill that utilizes the planting apparatuses of this invention. It is to be noted, however, that grain drill 10 could be used to plant other seeds such as soy beans or the like. Drill 10 is of the end-wheel variety and has large, high flotation wheels 11 located on the ends thereof which support a framework 12 upon which is mounted elongated hopper 14. Hopper 14 stores the seeds to be planted and often has a separate portion for fertilizer. A seed dispenser (not shown) and possibly a fertilizer dispenser which are driven from the end wheels dispense the seeds, and fertilizer if desired, via the tubes shown, to a plurality of planting apparatuses mounted on the drill at spaced positions. The drill may be of the trailing variety shown with a long hitch for connection to the tractor partially shown 14a, or a semi-mounted drill with a rear center caster wheel. Also a fully mounted drill could be employed.

A part of each drill 10 is a transversely extending shaft (not shown in FIG. 1) located on the forward part of the drill toward the tractor and denominated 15 in FIG. 2 upon which is mounted the individual drawbar 16 of each apparatus. Conventional, quick detachment couplers (not shown) connect the drawbars to the shaft so that the apparatuses are supported thereon in a trailing fashion. Levers, attached to a transversely extending front mounted rockshaft, when rotated, apply a force to preferably spring loaded (adjustable) pressure rods 17 (FIG. 2) with one rod pivotally connected to each apparatus. Thus each apparatus is forced toward the ground by the noted pressure rod. As shown in FIG. 1 the drawbars (which are integral assemblies of various elements) are of varied length but are otherwise identical to provide staggered apparatus mountings across the width of the drill with a spacing between implements of 10 inches down to 6 inches or less.

Individual planting apparatuses 18 are generally shown located on drill 10 in FIG. 1 and individually shown in FIGS. 2, 3, 4, 5 and 6, and, as noted, include a drawbar 16. Drawbar 16, adjacent its end remote from the tractor extends downwardly and rearwardly and provides the support for inclined, flat steel disk openers 23 and 24 mounted on conventional sealed bearings 25 and 26 (see FIG. 6). Also a part of drawbar 16 are preferably openings 28 and 29 with 28 having tube 30 connected thereto and also extending toward the hopper for the deposit of seed therethrough into the trench created by the disk openers. Rearward opening 29 is similarly connected to the hopper for the later deposit of fertilizer by tube 31.

Also a part of apparatus 18 is support 32 which is attached to drawbar 16 by bolts 33 and nuts 34 and hence is a rigid extension thereof. Support 32 provides the mounting for the press wheel and its adjustment on drawbar 16.

Bracket 36 is mounted on support 32 that extends generally rearward of drawbar 16 and has the primary function of providing a housing for the press wheel adjustment. Bracket 36 has a flange 37 which is mounted on the side of support 32 by lower bolt 38 and a nut not shown. Flange 37 also has a hole forward of bolt 38 for connection to support 32 via bolt 40 and nut 41 and spacer 41a. Also hole 42 is provided in flange 37 for a later to be described element. Bracket 36 further has a generally vertical flange 43 opposite flange 37 upon which is supported by suitable bolts and nuts gear support 44. Upper portion 44a extends between the flanges 37 and 43.

As mentioned, the press wheel adjustment is generally located in the housing created by the flanges 37 and 43. Specifically, bevel gear 45 is mounted in gear support 44 for rotation. Mating with bevel gear 45 is bevel gear 46 which is rotatable on an axis 90° to that of gear 45 with square shaft 48 that spans flanges 37 and 43. Shaft 48 has a round end 49 that is rotatable in hole 49a of flange 43. Shaft 48 also extends through hole 42 in flange 37 and has another round end that is rotationally supported in support 32 and is restrained from moving out of the flanges of bracket 36 in one direction by washers 50 and pin 51, adjacent support 32. Movement in a contrary direction is prevented by washer 53 and pin 54 adjacent gear 46.

Mounted adjacent gear 46 and remote from gear 45 is internal cam 55. Cam 55 has a square hole for movement with square shaft 48 along with gear 46. Cam 55 is further mounted within opening 56 in press wheel arm 57. Adjacent arm 57 and also flange 37 is washer 58 that absorbs the thrust applied.

Arm 57 extends forwardly toward the disks where same is mounted via slotted hole 59 to bolt 40. Arm 57 also extends rearwardly and, as shown in FIGS. 2 and 5, supports (in alignment with the disks) press wheel 60 having resilient, grooved rim 61 with spaced, transverse to the ground ribs 61a, by shaft 62 and conventional sealed bearing 63.

Providing structure for actuating gear 45 is handle assembly 65. Handle assembly 65 has shaft portion 66 extending therefrom and through an opening in portion 44a of bracket 36 for rotation therein. Shaft portion 66 has a lower square configuration that mates with a suitable configuration in gear 45 to rotate same. Retaining ring 67 located in a groove in shaft 66 upward of the square portion supports washer 68 and spring 69 that biases the handle toward gear 45. Washer 70 takes up clearance between gear support 44 and gear 45. Handle 65 also has a projection 71 that is adapted to engage holes 72 in portion 44a of bracket 36 by virtue of the action of spring 69.

As shown best in FIG. 3, 44a of bracket 36 has a series of five holes 72 for selective engagement of projection 71 as the handle is rotated. Referring also to FIG. 2, with handle 65 aligned with a pointer indicating hole No. 1, the cam 55 is in its lowest position. By rotating handle 65 clockwise as shown by the arrow after withdrawing the projection 71 from the hole, the gear 45 attached, is similarly rotated and drives gear 46 counterclockwise and thus cam 55 in the direction of the arrow. The cam acts on the arm 57, causing same to move upwardly and forwardly as allowed by slotted hole 59. Hence, press wheel 60 is moved a predetermined distance upwardly which, via pressure rod 17, causes the disks 23 and 24 to penetrate the ground more deeply. Projection 71 maintains the position selected along with bolt 40 in arm 57. Each hole No.'s 1–5 provides settings that vary by ⅜". Of course, all adjustments can be made with one hand and, if the spring load applied to the pressure rod is not too great, can be done without lifting the apparatus. Once set, the setting is maintained even if lifted for transport. Also noted is that the handle is readily accessible from the rear of the apparatus and due to the indicia for each hole, each apparatus can be set accordingly. Also noted from FIG. 3 is that the handle is generally coextensive with the apparatus as is the balance of the adjusting members. The slotted hole arm mounting provides a trailing type press wheel mounting while retaining the setting selected and supplies sufficient structure to overcome any strong pressure rod loads. Obviously also, the press wheel and its adjustment is readily installed on existing drills provided their drawbars have sufficient structure for the addition thereto of support 32 which effectively mounts thereto the adjustment and press wheel structure.

It is believed that the operation of the apparatus is apparent from the foregoing discussion and the specified advantages are readily achieved from the structure detailed.

What is claimed is:

1. A planting apparatus for a drawn grain drill comprising:

a. a drawbar adapted to be attached at a forward end to a drawbar shaft of a grain drill for pivotal movement therewith;
b. a pair of opposed, furrow forming disks rotatably mounted on said drawbar;
c. means adapted to be connected to the drill and connected to said drawbar for forcing said disks into the soil;
d. a seed tube located between said disks and extending toward the furrow for depositing seed therein, said tube being adapted to be connected to a seed dispenser; and
e. a press gauge wheel assembly mounted on said drawbar rearward of said disks for closing the furrow and compacting the soil on the seed, said assembly comprising:

a bracket mounted on said drawbar, an arm pivotally supported on said bracket, a wheel rotatably mounted on said arm, and a rearwardly facing adjustment means mounted on said bracket having a rotatable handle portion and a gear set for transferring said rotation to a generally vertical plane to said arm to control wheel position and hence furrow depth in response to force applied to said drawbar.

2. The apparatus of claim 1 in which said gear set is a pair of bevel gears.

3. The apparatus of claim 2 which said adjustment means further comprises a cam for acting on said arm.

4. The apparatus of claim 3 in which said cam is rotatably mounted for movement in said arm and in which said arm is mounted on said bracket with a slotted hole.

5. The apparatus of claim 4 in which said bracket has a plurality of spaced holes and said handle portion has complementary structure to selectively engage said holes to lock said handle portion to said bracket.

6. The apparatus of claim 5 in which said adjustment means further comprises means for biasing said handle portion toward a selected hole.

7. The apparatus of claim 6 in which said handle portion and said cam are rotatable for substantially 180°.

8. The apparatus of claim 7 in which said wheel has a resilient rim having a peripheral groove located between walls and equally spaced ribs extending normally between the walls for improved soil fracture.

* * * * *